United States Patent [19]

Just

[11] Patent Number: 4,896,368
[45] Date of Patent: Jan. 23, 1990

[54] THREE COMPONENT SLIDE BEARING

[75] Inventor: Karl Just, Friedrichshafen, Fed. Rep. of Germany

[73] Assignee: MTU Motoren- und Turbinen-Union Friedrichshafen GmbH, Friedrichshafen, Fed. Rep. of Germany

[21] Appl. No.: 317,910

[22] Filed: Mar. 1, 1989

[30] Foreign Application Priority Data

May 13, 1988 [DE] Fed. Rep. of Germany ....... 3816404

[51] Int. Cl.⁴ .............................................. F16C 33/06
[52] U.S. Cl. .................................. 384/276; 384/296; 384/295
[58] Field of Search ............... 384/276, 296, 295, 282, 384/294, 278, 206

[56] References Cited

U.S. PATENT DOCUMENTS

| 1,302,564 | 5/1919 | Klocke | 384/296 |
| 2,465,329 | 3/1949 | Murray | 384/296 |
| 4,072,368 | 2/1978 | Ehrentraut | 384/295 |
| 4,248,485 | 2/1981 | White et al. | |

Primary Examiner—Lenard A. Footland
Attorney, Agent, or Firm—Barnes & Thornburg

[57] ABSTRACT

In a three-component bearing, an intermediate layer 12 consisting of the harder bearing metal is arranged only in the axial edge areas of the bearing. In the highly stressed bearing center, the slide layer is supported directly by the steel-back bearing part. As a result, previously occurring fatigue fractures of the intermediate layer in the bearing center will be avoided.

2 Claims, 1 Drawing Sheet

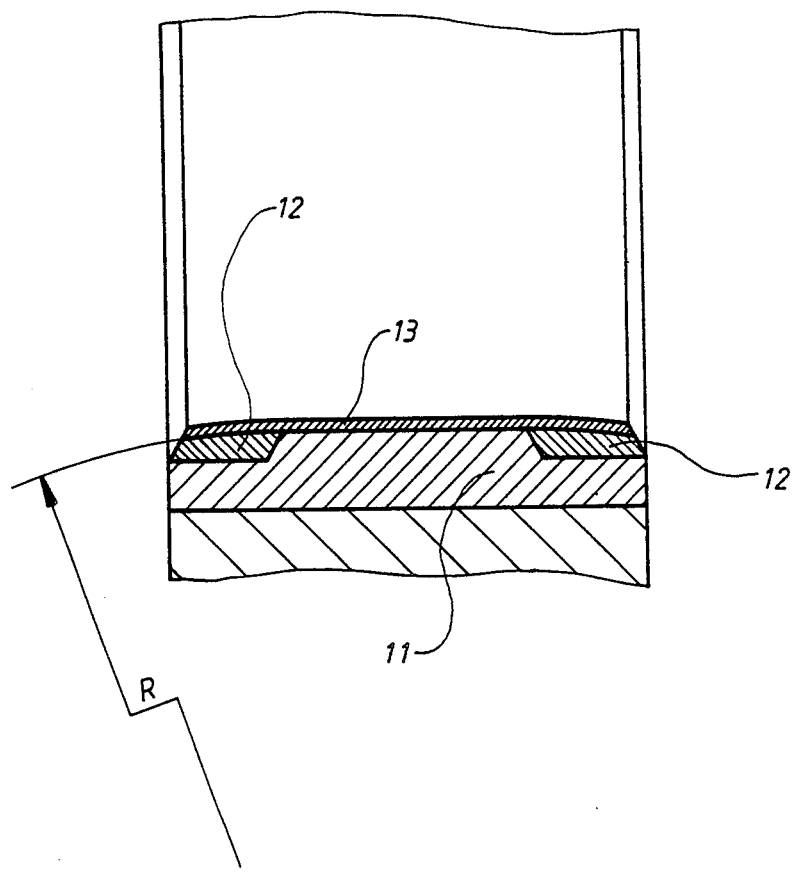

THREE COMPONENT SLIDE BEARING

BACKGROUND AND SUMMARY OF THE INVENTION

The invention relates to a three-component slide bearing having a steel-backed supporting part, an intermediate layer consisting of a harder bearing metal, and a thin slide layer consisting of a softer bearing metal, as known, for example, from MTZ Journal 42 (1981), No. 9, Page 381.

In three-component slide bearings of this type, which are highly stressed, it was found to be disadvantageous that the intermediate layer consisting of the harder bearing metal tends to experience fatigue fractures in the highly stressed bearing center, which leads to a breakdown of the bearing.

It is an object of the invention to provide a bearing construction in which the fatigue fractures of the intermediate layer in the highly stressed bearing center are avoided.

This object is achieved by providing an arrangement wherein the intermediate layer consisting of a harder bearing metal is disposed in the axial edge areas of the bearing which are endangered by a compression across the edges and arranged in surrounding recesses of the steel-backed supporting part, while, in the center area of the bearing, the thin slide layer is applied directly onto the steel-backed supporting part. In this case, the advantages of the three-component slide bearing are maintained with respect to the elastic absorption of the stress at the edges in contrast to the two-component bearing, while, in the bearing center, the thin slide layer consisting of the softer bearing metal is supported directly by the steel-backed supporting part.

The stressing of the edges is further reduced in especially preferred embodiments by means of a construction wherein the surface of the intermediate layer, which is coated with the softer bearing metal of the slide layer, is constructed to be spherical.

Other objects, advantages and novel features of the present invention will become apparent from the following detailed description of the invention when considered in conjunction with the accompanying drawings.

BRIEF DESCRIPTION OF THE DRAWINGS

The single drawing figure is a schematic sectional view showing a bearing constructed according to a preferred embodiment of the invention.

DETAILED DESCRIPTION OF THE DRAWINGS

The three-component bearing, which is shown as a partial section, has a steel-backed supporting part 11, an intermediate layer 12 consisting of a harder bearing metal, such as AlSn6, and a thin slide layer or moving layer 13 consisting of a softer bearing metal, such as PbSn18Cu2. The intermediate layer 12 is arranged in the axial edge area of the bearing in two surrounding recesses of the steel-backed supporting part 11. In order to reduce the compression across the edges, the surface of the intermediate layer 12, which is coated with the softer bearing metal of the slide layer 13, for example, galvanically, is constructed to be spherical, having the radius R.

Although the present invention has been described and illustrated in detail, it is to be clearly understood that the same is by way of illustration and example only, and is not to be taken by way of limitation. The spirit and scope of the present invention are to be limited only by the terms of the appended claims.

WHAT IS CLAIMED:

1. A three-component slide bearing having a steel-backed supporting part, an intermediate layer consisting of a harder bearing metal, and a thin slide layer consisting of a softer bearing metal, wherein the intermediate layer consisting of a harder bearing metal is disposed in the axial edge areas of the bearing which are endangered by a compression across the edges and arranged in surrounding recesses of the steel backed supporting part, while, in the center area of the bearing, the thin slide layer is applied directly onto the steel-backed supporting part.

2. A three-component slide bearing according to claim 1, wherein the surface of the intermediate layer, which is coated with the softer bearing metal of the slide layer, is constructed to be part-circular in cross section.

* * * * *